(12) United States Patent
Yamazaki et al.

(10) Patent No.: US 11,388,643 B2
(45) Date of Patent: Jul. 12, 2022

(54) USER TERMINAL AND MOBILE COMMUNICATION METHOD

(71) Applicant: KYOCERA Corporation, Kyoto (JP)

(72) Inventors: Chiharu Yamazaki, Tokyo (JP); Masato Fujishiro, Yokohama (JP); Yushi Nagasaka, Ritto (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 16/918,983

(22) Filed: Jul. 1, 2020

(65) Prior Publication Data

US 2020/0336962 A1    Oct. 22, 2020

Related U.S. Application Data

(63) Continuation of application No. 15/726,716, filed on Oct. 6, 2017, now Pat. No. 10,716,046, which is a (Continued)

(30) Foreign Application Priority Data

Apr. 10, 2015  (JP) .............................. JP2015-080774

(51) Int. Cl.
*H04W 36/22* (2009.01)
*H04W 48/20* (2009.01)
(Continued)

(52) U.S. Cl.
CPC ........... *H04W 36/22* (2013.01); *H04W 36/04* (2013.01); *H04W 36/30* (2013.01); *H04W 48/20* (2013.01);
(Continued)

(58) Field of Classification Search
CPC ............. H04W 28/08; H04W 52/0206; H04W 52/0212; H04W 74/0875; H04W 76/045; H04W 36/04; H04W 36/0016; H04W 36/22; H04W 36/30; H04W 36/0094; H04W 48/20; H04W 74/0833
See application file for complete search history.

(56) References Cited

U.S. PATENT DOCUMENTS 9,271,183 B1 *  2/2016  Oroskar ............ H04W 72/1252
2006/0111110 A1  5/2006  Schwarz et al.
(Continued)

FOREIGN PATENT DOCUMENTS

JP    2011-061456 A    3/2011
JP    2014-003701 A    1/2014
(Continued)

OTHER PUBLICATIONS

International Search Report issued in PCT/JP2016/060993; dated Jun. 21, 2016.
(Continued)

*Primary Examiner* — Michael Thier
*Assistant Examiner* — Prince A Mensah
(74) *Attorney, Agent, or Firm* — Studebaker & Brackett PC

(57) ABSTRACT

A user equipment, apparatus, and method transmits a random access preamble to a cell and receives a message including a random access response as a response to the random access preamble from the cell. The message indicates that a Radio Resource Control (RRC) connection to the cell is rejected.

3 Claims, 8 Drawing Sheets

Related U.S. Application Data continuation of application No. PCT/JP2016/060993, filed on Apr. 4, 2016.

(51) Int. Cl.
  *H04W 36/04* (2009.01)
  *H04W 36/30* (2009.01)
  *H04W 36/00* (2009.01)
  *H04W 74/08* (2009.01)

(52) U.S. Cl.
  CPC .... *H04W 36/0016* (2013.01); *H04W 36/0094* (2013.01); *H04W 74/0833* (2013.01)

(56) References Cited

U.S. PATENT DOCUMENTS

| | | |
|---|---|---|
| 2009/0196270 A1 | 8/2009 | Iwai et al. |
| 2010/0323719 A1 | 12/2010 | Jen |
| 2011/0199905 A1 | 8/2011 | Pinheiro et al. |
| 2013/0242874 A1 | 9/2013 | Li et al. |
| 2014/0029530 A1 | 1/2014 | Kim et al. |
| 2014/0161103 A1 | 6/2014 | Sirotkin et al. |
| 2014/0293776 A1 | 10/2014 | Yang et al. |
| 2014/0334389 A1 | 11/2014 | Abdel-Samad et al. |
| 2015/0045038 A1 | 2/2015 | Gao et al. |
| 2015/0282030 A1 | 10/2015 | Vrind et al. |
| 2015/0289182 A1 | 10/2015 | Peisa et al. |
| 2015/0359026 A1 | 12/2015 | Iwai et al. |
| 2016/0073312 A1 | 3/2016 | Sridhar |
| 2016/0127969 A1 | 5/2016 | Pao et al. |
| 2017/0078933 A1 | 3/2017 | Li et al. |
| 2017/0164250 A1 | 6/2017 | Kim et al. |
| 2018/0020486 A1* | 1/2018 | Yano ................ H04W 72/0486 |

FOREIGN PATENT DOCUMENTS

| | | |
|---|---|---|
| WO | 2013/143649 A1 | 10/2013 |
| WO | 2014/097517 A1 | 6/2014 |

OTHER PUBLICATIONS

3rd Generation Partnership Project; Technical Specification Group Radio Access Network; Evolved Universal Terrestrial Radio Access (E-UTRA); User Equipment (UE) procedures in idle mode; 3GPP TS 36.304 V12.4.0; Mar. 2015; pp. 1-38; Release 12; 3GPP Organizational Partners.

Kyocera; Potential issues in multi-carrier load distribution; 3GPP TSG-RAN WG2 #89-bis; R2-151540; Apr. 20-24, 2015; pp. 1-5; Bratislava, Slovak Republic.

* cited by examiner

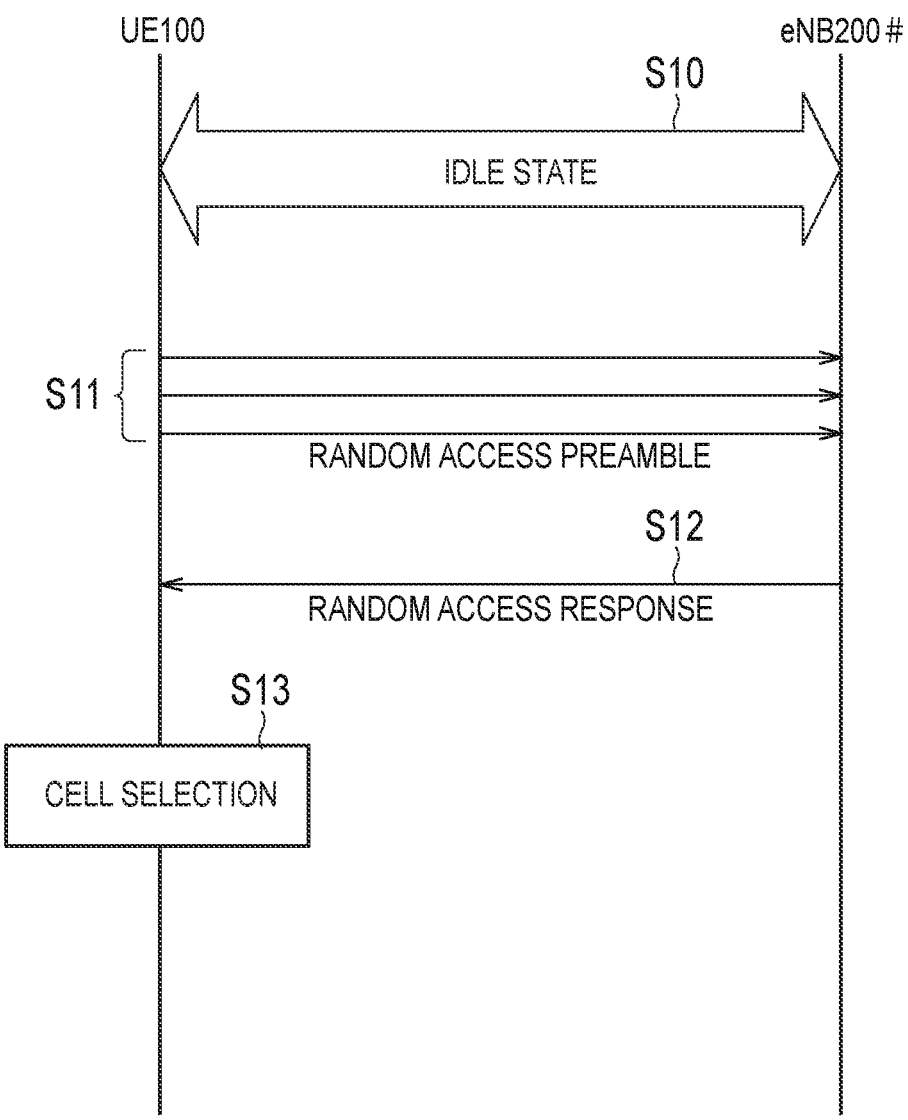

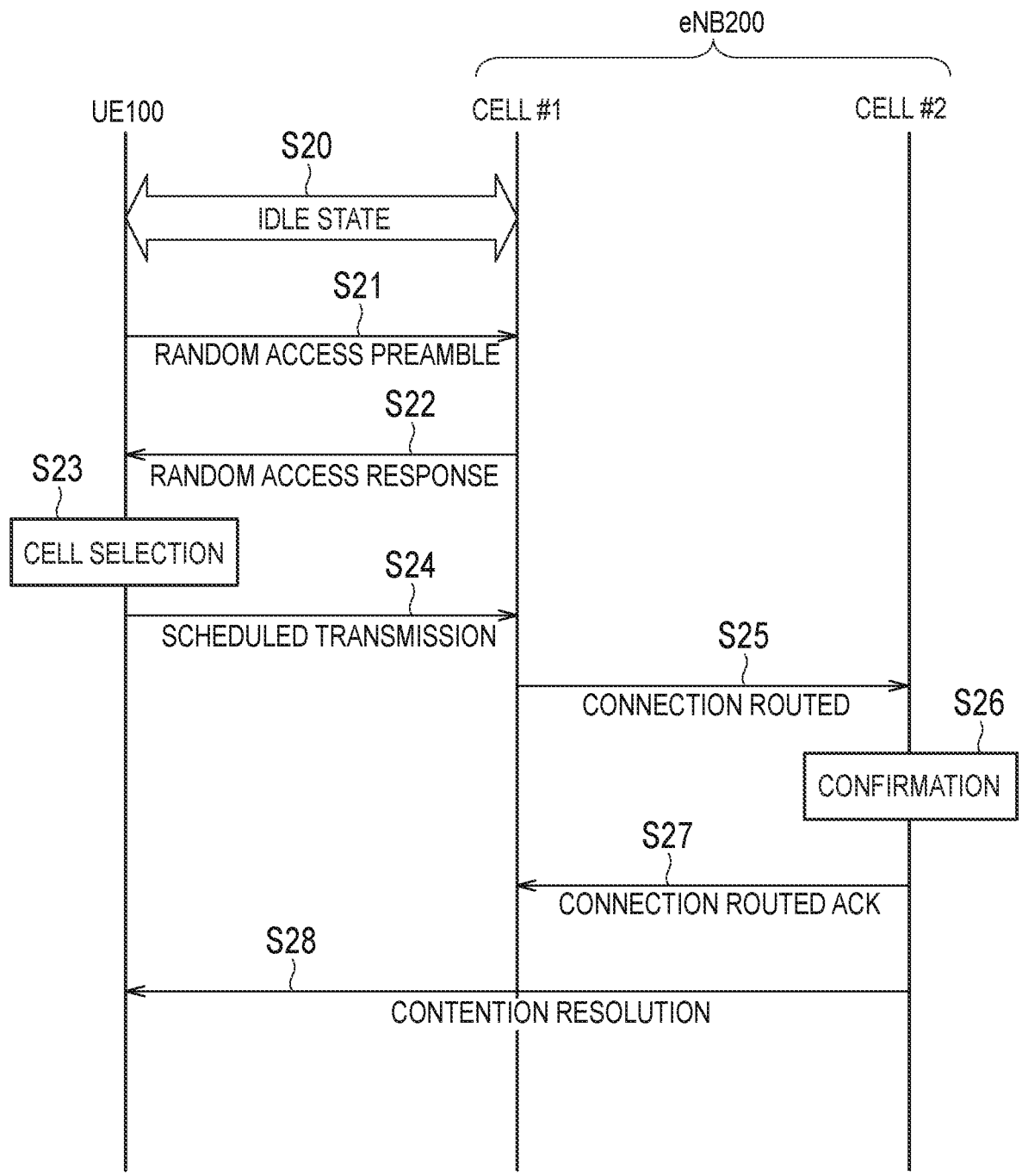

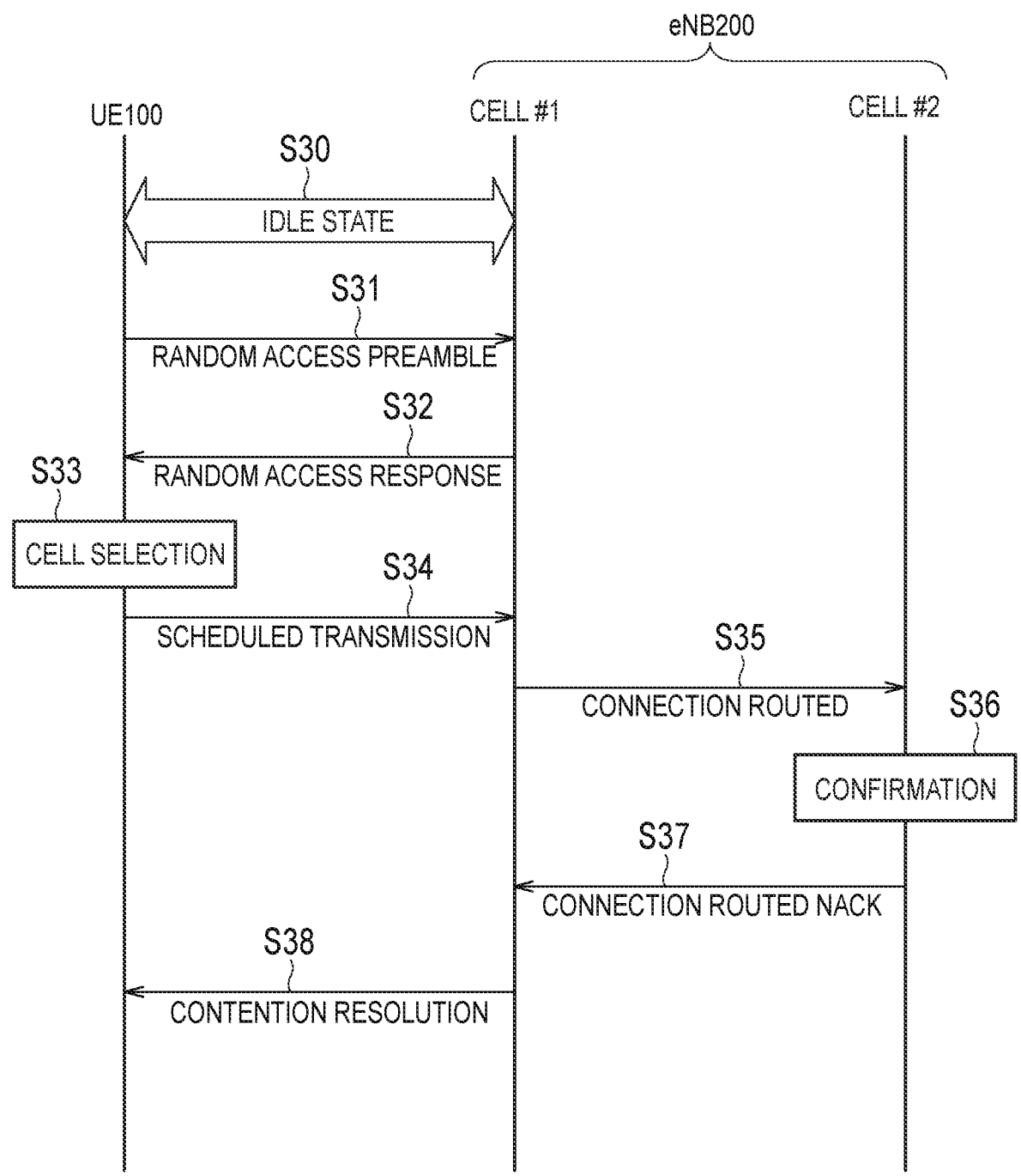

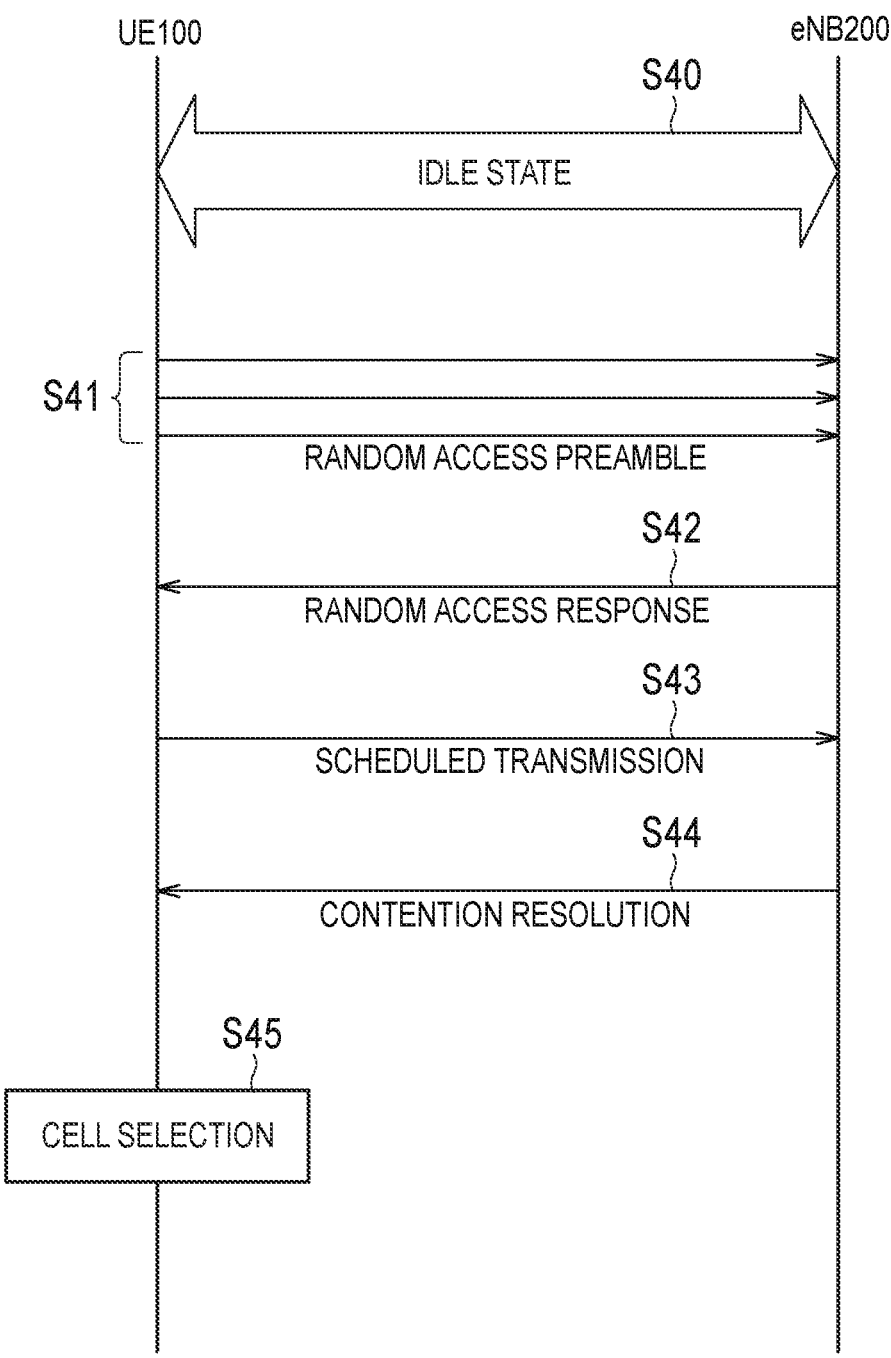

USER TERMINAL AND MOBILE COMMUNICATION METHOD

CROSS-REFERENCE TO RELATED APPLICATIONS

The present application is a Continuation of U.S. patent application Ser. No. 15/726,716 filed Oct. 6, 2017, which is a continuation based on PCT Application No. PCT/JP2016/060993 filed on Apr. 4, 2016, which claims the benefit Japanese Patent Application No. 2015-080774 (filed on Apr. 10, 2015). The content of which is incorporated by reference herein in their entirety.

FIELD

The present application relates to a user terminal and a mobile communication method for selecting a selection target cell used as a serving cell from among a plurality of cells.

BACKGROUND

In 3GPP (3rd Generation Partnership Project), which is a project aiming to standardize a mobile communication system, a technology for selecting a selection target cell used as a serving cell from among a plurality of cells operated at different frequencies is proposed (for example, see Non Patent Literature 1).

Specifically, a user terminal measures, if a start condition is satisfied, a quality of a neighboring cell adjacent to a current serving cell, and selects, from cells that satisfy a selection condition, a selection target cell used as a serving cell.

SUMMARY

A user equipment according to the present disclosure comprises a processor and a memory coupled to the processor. The processor is configured to transmit a random access preamble to a cell and receive a message including a random access response as a response to the random access preamble from the cell. The message indicates that a Radio Resource Control (RRC) connection to the cell is rejected.

An apparatus for controlling a user equipment according to the present disclosure comprises a processor and a memory coupled to the processor. The processor is configured to transmit a random access preamble to a cell and receive a message including a random access response as a response to the random access preamble from the cell. The message indicates that a Radio Resource Control (RRC) connection to the cell is rejected.

A method performed at a user equipment according to the present disclosure comprises transmitting a random access preamble to a cell and receiving a message including a random access response as a response to the random access preamble from the cell. The message indicates that a Radio Resource Control (RRC) connection to the cell is rejected.

BRIEF DESCRIPTION OF THE DRAWINGS

FIG. 7 is a sequence diagram illustrating a mobile communication method according to the embodiment.
FIG. 8 is a sequence diagram illustrating a mobile communication method according to a second modification.
FIG. 9 is a sequence diagram illustrating the mobile communication method according to the second modification.
FIG. 10 is a sequence diagram illustrating the mobile communication method according to a third modification.

DESCRIPTION OF THE EMBODIMENT

Figure 1:
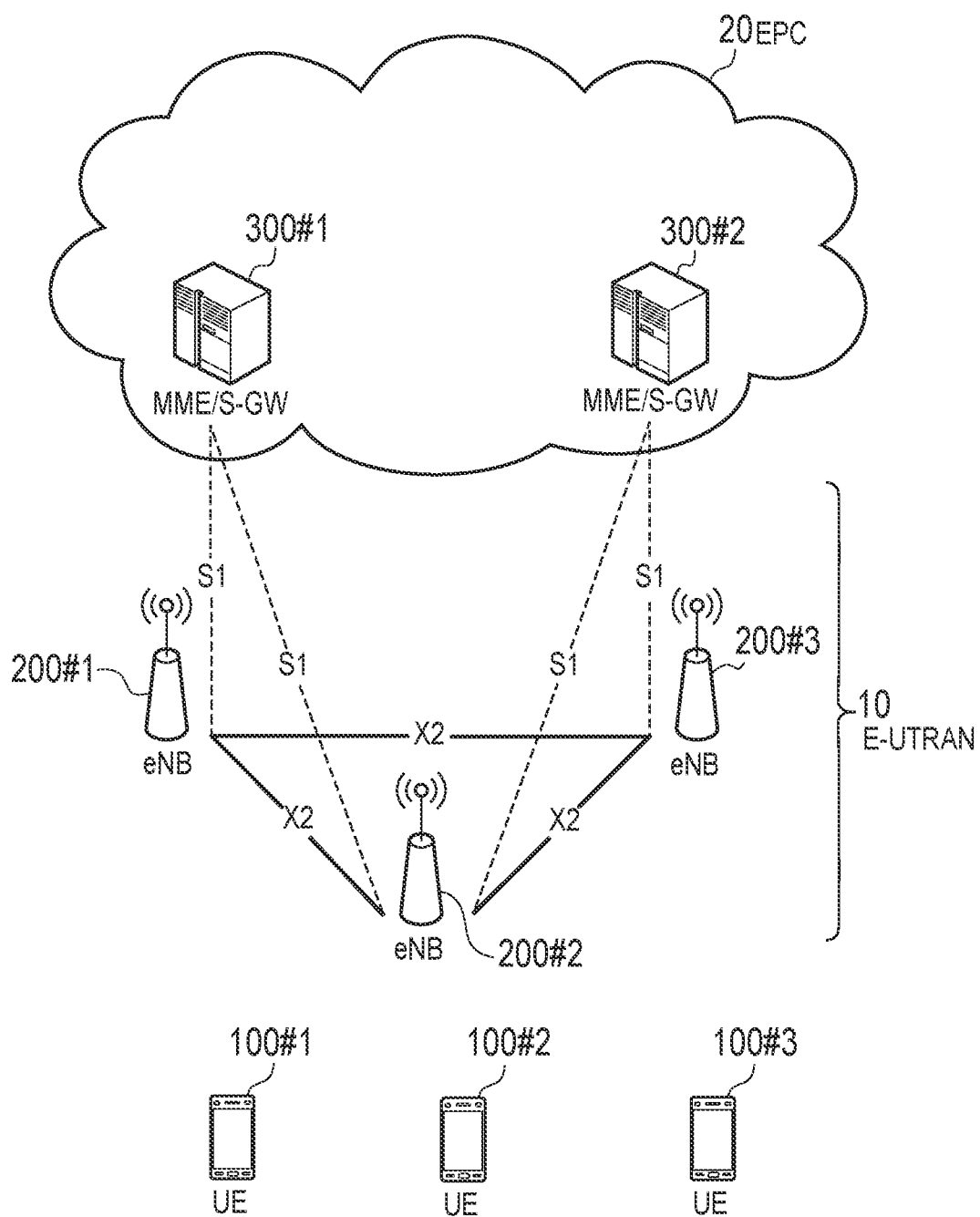
FIG. 1 is a configuration diagram of an LTE system according to an embodiment.

In the mobile communication system described in BACKGROUND ART, a user terminal in an RRC idle state using a certain cell as a serving cell may transition to an RRC connected state using a certain cell as a connection target cell. That is, the number of user terminals in an RRC idle state using a certain cell as a serving cell is a potential load for the certain cell.

However, in selection of a selection target cell, the load of each cell is not taken into consideration. Therefore, load distribution of each cell may not be appropriately performed.

Therefore, an embodiment has been made to resolve the above-described problem, and provides a user terminal and a mobile communication method capable of appropriately performing load distribution of each cell.

A mobile communication system according to an embodiment is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

A user terminal according to the summary comprises a controller configured to interrupt, in response to a predetermined message received from a connection target cell in a random access procedure, the random access procedure and to select a selection target cell used as a serving cell from among a plurality of cells.

In the user terminal according to the summary, the controller interrupts, in response to a predetermined message received from a connection target cell in a random access procedure, the random access procedure and selects a selection target cell. That is, if the load of the connection target cell is high, the controller quickly prompts the user terminal to select the selection target cell. Therefore, load distribution of each cell can be appropriately performed. In other words, a user terminal in the RRC idle state can be appropriately distributed to each cell.

Embodiments

An embodiment will be described by using, as an example, an LTE system based on 3GPP standards as a mobile communication system, below.

(System Configuration)

The system configuration of LTE system according to a first embodiment will be described. FIG. 1 is a configuration diagram of the LTE system according to the embodiment.

As illustrated in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell in a case where the UE 100 is in an RRC connected state) formed by the eNB 200. The configuration of the UE 100 will be described later.

The E-UTRAN 10 corresponds to a radio access network. The E-UTRAN 10 includes eNB 200 (an evolved Node-B). The eNB 200 corresponds to a radio base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resources management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
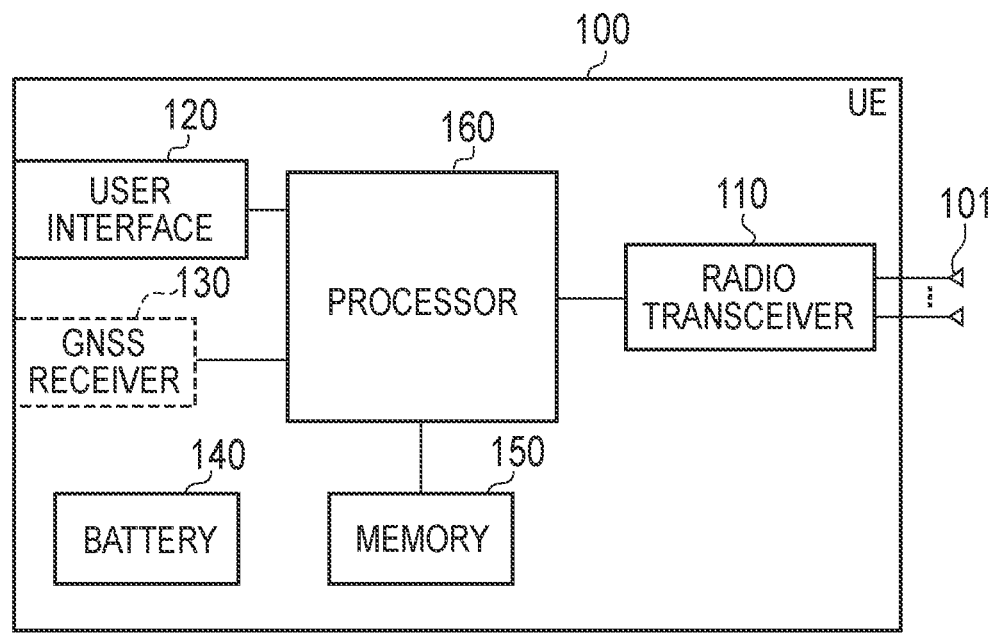
FIG. 2 is a block diagram of a UE 100 according to the embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a controller. The radio transceiver 110 and the processor 160 constitute a transmitter and a receiver. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
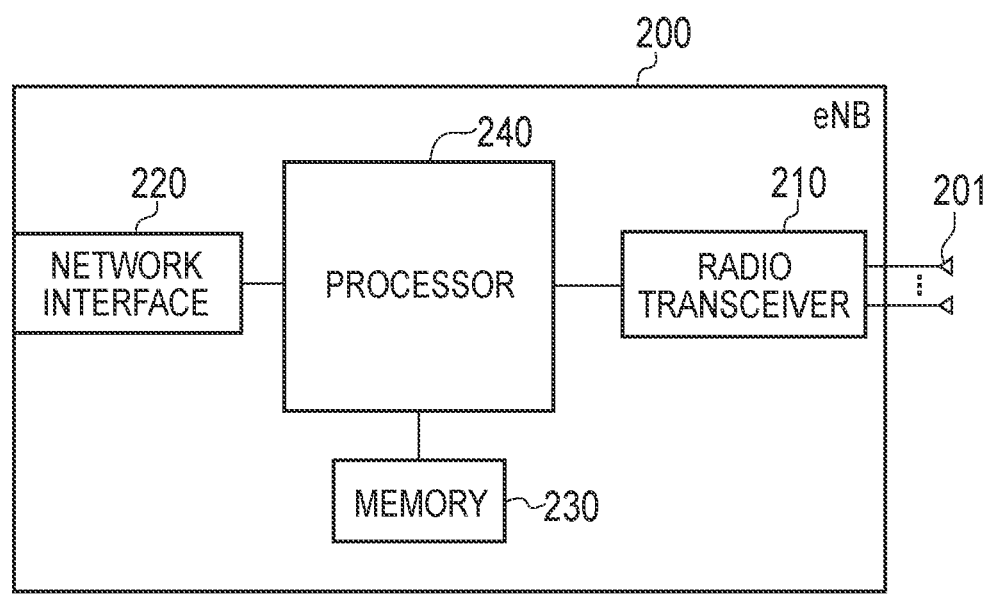
FIG. 3 is a block diagram of an eNB 200 according to the embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a controller. The radio transceiver 210 and the processor 240 constitute a transmitter and a receiver. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface, and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
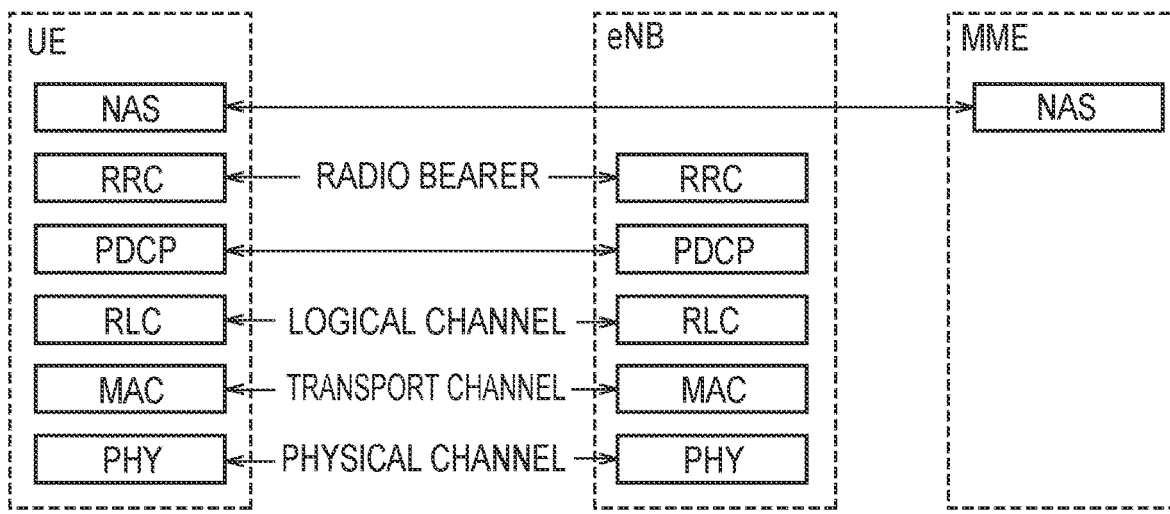
FIG. 4 is a protocol stack diagram of a radio interface according to the embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption. It should also be noted that in the PDCP layer, a transmitting entity for transmitting data unit (PDCP PDU) or a receiving entity for receiving data unit (PDCP PDU) is formed.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. When there is no connection (an RRC connection) between the RRC of the UE 100 and the RRC of the eNB 200, the UE 100 is in an RRC idle state.

An NAS (Non-Access Stratum) layer positioned above the RRC layer performs session management, mobility management and the like.

Figure 5:
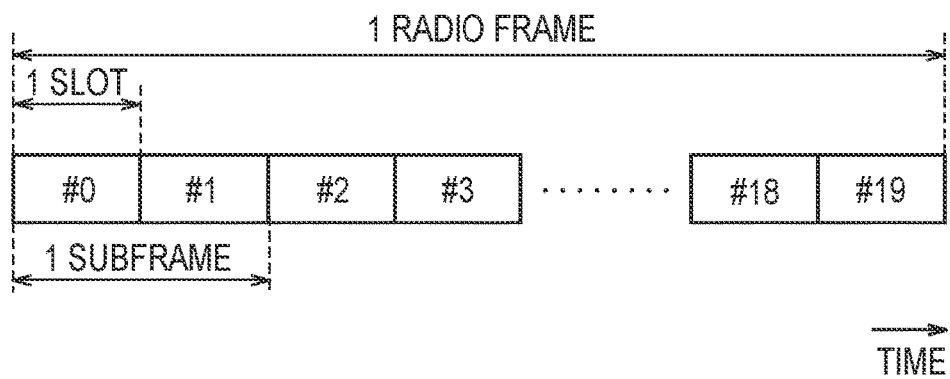
FIG. 5 is a configuration diagram of a radio frame used in the LTE system according to the embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

(Application Scene)

Figure 6:
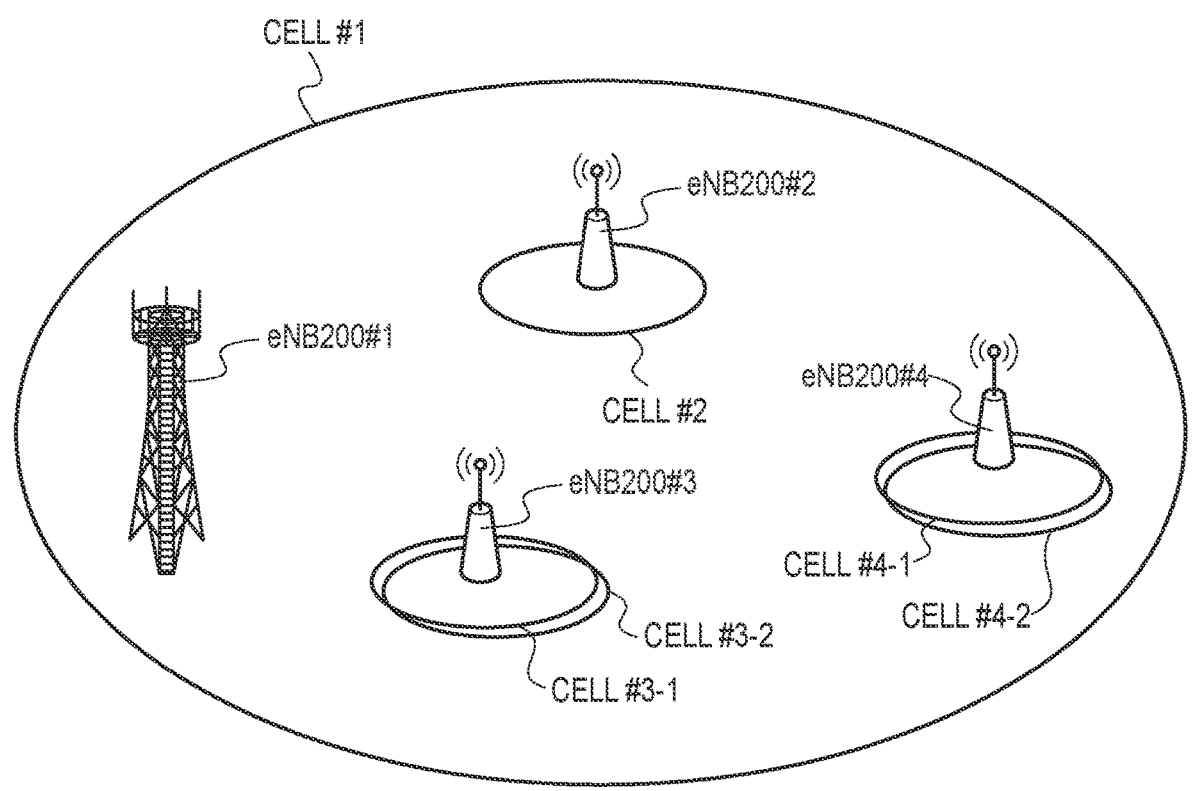
FIG. 6 is a diagram for describing an application scene according to the embodiment.

An application scene will be described, below. FIG. 6 is a diagram for describing an application scene according to the embodiment.

As illustrated in FIG. 6, a plurality of eNBs 200 (for example, an eNB 200#1, an eNB 200#2, an eNB 200#3, and an eNB 200#4) are provided. The eNB 200#1 has a cell #1 as a radio communication area, the eNB 200#2 has a cell #2 as a radio communication area, the eNB 200#3 has a cell #3-1 and a cell #3-2 as a radio communication area, and the eNB 200#4 has a cell #4-1 and a cell #4-2 as a radio communication area.

It is noted that the cell #2, the cell #3-1, the cell #3-2, the cell #4-1, and the cell #4-2 overlap with the cell #1. Further, each cell is operated at respectively different frequencies. A priority is defined for the frequencies where each cell is operated. The correspondence relationship between the frequency and the priority is included in system information (SIB; System Information Block) broadcast from the eNB 200.

Under such a premise, the UE 100 selects a selection target cell used as a serving cell from among the plurality of cells operated at different frequencies. Specifically, the UE 100 measures, if a start condition is satisfied, the quality of a neighboring cell adjacent to a current serving cell, and selects, from cells that satisfies a selection condition, a selection target cell used as a serving cell.

Firstly, the start condition is shown as follows:

(A1) A frequency having a higher priority than the priority of the frequency of the current serving cell the UE 100 always measures the quality of the frequency having high priority.

(A2) A frequency having a priority equal to or lower than the priority of the frequency of the current serving cell the UE 100 measures, if the quality of the current serving cell falls below a predetermined threshold value, the quality of the frequency having equal priority or lower priority.

Secondly, the selection condition is shown as follows:

(B1) The priority of the frequency of the neighboring cell is higher than the priority of the current serving cell the UE 100 selects a cell that satisfies a relationship of $Squal > Thresh_{X,\ HighQ}$ over a predetermined period ($Treselection_{RAT}$), or a cell that satisfies a relationship of $Srxlev > Thresh_{X,\ HighP}$ over the predetermined period ($Treselection_{RAT}$) as the selection target cell. In such a case, such criteria to be satisfied by the neighboring cell is sometimes referred to as "S-criteria".

It is noted that Squal represents a cell selection quality level, and is calculated by $Squal = Q_{qualmeas} - (Q_{qualmin} + Q_{qualminoffset}) - Qoffset_{temp}$. $Q_{qualmeas}$ is a quality level (RSRQ) of the neighboring cell, $Q_{qualmin}$ is a minimum request quality level, $Q_{qualminoffset}$ is a predetermined offset constantly applied to the neighboring cell, and $Qoffset_{temp}$ is an offset temporarily applied to the neighboring cell. $Thresh_{X,\ HighQ}$ is a predetermined threshold value.

Further, Srxlev represents a cell selection reception level, and is calculated by $Srxlev = Q_{rxlevmeas} - (Q_{rxlevmin} + Q_{rxlevminoffset}) - Pcompensation - Qoffset_{temp}$. $Q_{rxlevmeas}$ is a reception level (RSRP) of the neighboring cell, $Q_{rxlevmin}$ is a minimum request reception level, $Q_{rxlevminoffset}$ is a predetermined offset constantly applied to the neighboring cell, Pcompensation is a parameter related to uplink capability, and $Qoffset_{temp}$ is an offset temporarily applied to the neighboring cell. $Thresh_{X,\ HighP}$ is a predetermined threshold value.

(B2) The priority of the frequency of the neighboring cell is the same as the priority of the current serving cell The UE 100 calculates a ranking $R_s$ of the current serving cell and a ranking $R_n$ of the neighboring cell, and selects, as the selection target cell, the cell having the higher ranking $R_n$ than the $R_s$ over the predetermined period ($Treselection_{RAT}$). In such a case, such criteria to be satisfied by the neighboring cell is sometimes referred to as "R-criteria".

It is noted that $R_s$ is calculated by $R_s = Q_{meas's} + Q_{Hyst} - Qoffset_{temp}$. $R_n$ is calculated by $R_n = Q_{meas'n} - Qoffset - Qoffset_{temp}$. $Q_{meas's}$ is the reception level (RSRP) of the current serving cell, and $Q_{meas'n}$ is the reception level (RSRP) of the neighboring cell. $Q_{Hyst}$ is a hysteresis value for facilitating reselection of the current serving cell as the selection target cell. $Qoffset_{temp}$ is an offset temporarily applied to the current serving cell and the neighboring cell.

(B3) The priority of the frequency of the neighboring cell is lower than the priority of the current serving cell The UE 100 selects, under a premise that $Squal < Thresh_{Serving,\ LowQ}$ is satisfied over a predetermined period ($Treselection_{RAT}$), or $Srxlev < Thresh_{Serving,\ LowP}$ is satisfied over a predetermined period ($Treselection_{RAT}$), the selection target cell, from the neighboring cells by a method similar to the above-described (B1).

It is noted that $Thresh_{Serving,\ LowQ}$ and $Thresh_{Serving,\ LowP}$ are predetermined threshold values similarly to $Thresh_{X,\ HighQ}$ and $Thresh_{X,\ HighP}$.

It is noted that, various types of parameters used for selecting the selection target cell are included in broadcast information (SIB; System Information Block) broadcast from the eNB 200. The various types of parameters include the priority of the frequency (cellReselectionPriority), a predetermined period (Treselection$_{RAT}$), various types of offsets ($Q_{qualminoffset}$, $Q_{rxlevminoffset}$, Qoffset$_{temp}$, $Q_{Hyst}$, Qoffset), and various types of threshold values (Thresh$_{X, HighQ}$, Thresh$_{X, HighP}$, Thresh$_{Serving, LowQ}$, Thresh$_{Serving, LowP}$).

In the embodiment, the UE 100 (controller) interrupts, in response to a predetermined message received from the connection target cell in a random access procedure, the random access procedure, and selects, from among a plurality of cells, the selection target cell used as the serving cell. The predetermined message is a message to be transmitted, to the UE 100, from the connection target cell, in the random access procedure, and may be, for example, a random access response, or may be a contention resolution. Further, the predetermined message is preferably transmitted from the connection target cell, if a load of the connection target cell is equal to or more than a constant level.

Here, the UE 100 (controller) lowers, in response to reception of the predetermined message, the priority with which the connection target cell is selected as the selection target cell. For example, the UE 100 (controller) changes the priority (cellReselectionPriority) of the connection target cell to the lowest priority. Alternatively, the UE 100 (controller) may lower the priority (cellReselectionPriority) of the frequency of the connection target cell by a predetermined number of levels.

In the embodiment, the predetermined message may include a parameter used for selecting the selection target cell. The parameter used for selecting the selection target cell includes the priority of the frequency (cellReselectionPriority), a predetermined period (Treselection$_{RAT}$), various types of offsets ($Q_{qualminoffset}$, $Q_{rxlevminoffset}$, Qoffset$_{temp}$, $Q_{Hyst}$, Qoffset), and the various types of threshold values (Thresh$_{X, HighQ}$, Thresh$_{X, HighP}$, Thresh$_{Serving, LowQ}$, Thresh$_{Serving, LowP}$). In such a case, the parameter used for selecting the selection target cell is preferably a parameter that makes it difficult to select the connection target cell as the selection target cell. The UE 100 (controller) selects, based on the above-described parameter, the selection target cell, from among the plurality of cells.

Alternatively, the predetermined message may include recommend information for recommending that a cell other than the connection target cell is selected as the selection target cell. The UE 100 (controller) selects, in response to reception of the recommend information, the selection target cell used as the serving cell, from among neighboring cells other than the connection target cell.

The recommend information may include a list of a candidate cell that may be selected as the selection target cell. The UE 100 (controller) selects, in response to reception of the recommend information, the selection target cell used as the serving cell, from among the neighboring cells included in the list of the candidate cell.

Further, the recommend information preferably includes an additional offset to be applied to a metric for determining whether or not to select the candidate cell as the selection target cell so that the candidate cell is easily selected as the selection target cell. The metric is a value such as the above-described Squal ($Q_{qualmeas}$=RSRQ), Srxlev, ($Q_{rxlevmeas}$=RSRP), and a ranking $R_n$. The additional offset is, for example, a value for changing these values, so that the candidate cell is easily selected as the selection target cell.

In such a case, the UE 100 (controller) preferably starts, upon application of the additional offset, if the metric for determining whether or not to select the connection target cell as the selection target cell falls below the metric for determining whether or not to select the candidate cell as the selection target cell, selecting the selection target cell. On the other hand, the UE 100 (controller) preferably resumes, upon application of the additional offset, if the metric for determining whether or not to select the connection target cell as the selection target cell exceeds the metric for determining whether or not to select the candidate cell as the selection target cell, the random access procedure.

(Mobile Communication Method)

Hereinafter, the mobile communication method according to the embodiment will be described. FIG. 7 is a sequence diagram illustrating the mobile communication method according to the embodiment.

As illustrated in FIG. 7, in step S10, the UE 100 is in the RRC idle state.

In step S11, the UE 100 starts the random access procedure. Specifically, the UE 100 transmits, to the eNB 200 (connection target cell), a message (Random Access Preamble) including a random access preamble selected from among a plurality of random access preambles. The UE 100 increases transmission power of the message (Random Access Preamble) each time the message (Random Access Preamble) is transmitted.

Here, the UE 100 preferably transmits a specific message (Random Access Preamble), upon having a function of selecting of the selection target cell in the random access procedure. The specific message may be a message (Random Access Preamble) composed of a specific preamble used for the random access, or may be a message (Random Access Preamble) transmitted by using a specific resource (resource block).

On the other hand, the UE 100 preferably transmits an existing message (Random Access Preamble) different from the specific message, upon not having the function of selecting the selection target cell in the random access procedure. The existing message may be a message (Random Access Preamble) composed of an existing preamble different from the specific preamble used for the random access, or may be a message (Random Access Preamble) transmitted by using the resource (resource block) other than the specific resource.

Thereby, the eNB 200 (connection target cell) can determine, by the type of the random access preamble or the type of the resource used for transmitting the message, whether or not the UE 100 has the function of selecting the selection target cell in the random access procedure.

In step S12, the UE 100 receives, from the eNB 200 (connection target cell), a response message (Random Access Response) to the message (Random Access Preamble).

Here, the response message (Random Access Response) is, as described above, an example of a predetermined message for prompting to select the selection target cell used as the serving cell. The eNB 200 (connection target cell) transmits the response message (Random Access Response) as the predetermined message, if a load of the connection target cell is equal to or more than a constant level. It is noted that, such a response message (Random Access Response) may mean that the eNB 200 (connection target cell) does not accept a message requesting a configuration of an RRC connection (RRC Connection Request) or that the eNB 200 (connection target cell) does not accept an RRC layer message.

It should be noted that, the response message (Random Access Response) used as the predetermined message for prompting to select the selection target cell used as the serving cell is distinguished from the response message (Random Access Response) for continuing the random access procedure. For example, both are distinguished from each other by a 1-bit flag, and the like.

In step S13, the UE 100 (controller) interrupts, in response to the predetermined message received from the eNB 200 (connection target cell) in the random access procedure, the random access procedure, and selects, from among a plurality of cells, the selection target cell used as the serving cell. Information included in the predetermined message and a method of selecting the selection target cell upon reception of the predetermined message are as described above.

(Operation and Effect)

The UE 100 (controller) according to the embodiment interrupts, in response to the predetermined message received from the connection target cell in the random access procedure, the random access procedure, and selects the selection target cell. That is, if the load of the connection target cell is high, the controller quickly prompts the UE 100 to select the selection target cell. Therefore, load distribution of each cell can be appropriately performed. In other words, the UE 100 in the RRC idle state can be appropriately distributed to each cell.

[First Modification]

A first modification of the embodiment will be described, below. Description proceeds with a focus on a difference from the embodiment, below.

Specifically, in the embodiment, the predetermined message received from the connection target cell in the random access procedure includes the recommend information including the list of the candidate cell that may be selected as the selection target cell. On the contrary, in the first modification, the UE 100 (controller) notifies, in the random access procedure, the connection target cell of a neighboring cell adjacent to the connection target cell, as a candidate cell that may be selected as the selection target cell.

Specifically, the UE 100 (controller) notifies the connection target cell of the candidate cell, by performing the random access procedure using a random access preamble associated with the candidate cell.

Here, the random access preamble may be associated with one candidate cell. In such a case, the recommend information may not include the list of the candidate cell, and may include the list of the candidate cell including one candidate cell notified from the UE 100. The UE 100 (controller) may omit the evaluation indicated in the above-described (B1) to (B3), and use one candidate cell notified from the UE 100 to the connection target cell, as the serving cell.

Alternatively, the random access preamble may be associated with a plurality of candidate cells. In such a case, the predetermined message includes information indicating a cell selected from among the plurality of candidate cells notified from the UE 100. For example, the recommend information may include a cell selected from among the plurality of candidate cells notified from the UE 100. If the cell selected by the connection target cell is one cell, the UE 100 (controller) may omit the evaluation indicated in the above-described (B1) to (B3), and use the cell selected by the connection target cell as the serving cell. If the cell selected by the connection target cell is a plurality of cells, the UE 100 (controller) may select, from among the plurality of cells, the selection target cell according to the evaluation indicated in the above-described (B1) to (B3).

Here, if the random access preamble is associated with one candidate cell, the response message (Random Access Response) which is a predetermined message includes a 1-bit flag indicating that the response message is the predetermined message. The 1-bit flag means that the random access procedure for the connection target cell is interrupted, and selection of the selection target cell used as the serving cell is instructed. On the other hand, if the random access preamble is associated with the plurality of candidate cells, the response message (Random Access Response) which is the predetermined message preferably includes an index indicating a candidate cell narrowed down, by the eNB 200 (connection target cell), from among the plurality of candidate cells.

[Second Modification]

A second modification of the embodiment will be described, below. Description proceeds with a focus on a difference from the embodiment, below.

In the second modification, after the random access procedure for the connection target cell is interrupted, if the selection target cell is selected, the UE 100 (controller) resumes the random access procedure interrupted for the selection target cell. In such a case, the connection target cell notifies, via the X2 interface, the selection target cell of RACH information (TA (Timing Advance), random access preamble, and the like) used in the random access procedure. Thereby, it is possible to shorten the random access procedure as compared to a case where the random access procedure for the selection target cell is performed again from the beginning.

The connection target cell preferably notifies, if the recommend information including the list of the candidate cell is notified to the UE 100, all of the cells included in the list of the candidate cell of the RACH information. Alternatively, the connection target cell preferably notifies, if candidate cells are notified from the UE 100, all of the candidate cells notified from the UE 100 of the RACH information.

It is noted that, the connection target cell and the selection target cell are preferably cells provided in the identical eNB 200 (co-located or quasi-collocated).

(Mobile Communication Method)

Hereinafter, the mobile communication method according to the second modification will be described. FIG. 8 and FIG. 9 are sequence diagrams illustrating the mobile communication method according to the second modification. It is noted that, in FIG. 8 and FIG. 9, a case where the connection target cell is the cell #1 and the selection target cell is the cell #2 is exemplified.

Firstly, a case where the random access procedure for the selection target cell succeeds will be described with reference to FIG. 8.

As illustrated in FIG. 8, in step S20, the UE 100 is in the RRC idle state, similarly to step S10.

In step S21, similarly to step S11, the UE 100 starts the random access procedure. Specifically, the UE 100 transmits, to the eNB 200 (cell #1), a message (Random Access Preamble) including a random access preamble selected from among a plurality of random access preambles.

In step S22, similarly to step S12, the UE 100 receives, from the eNB 200 (cell #1), a response message (Random Access Response) to the message (Random Access Preamble). Here, the response message (Random Access Response) is, as described above, an example of a predetermined message for prompting to select the selection target cell used as the serving cell.

In step S23, similarly to step S13, the UE 100 interrupts, in response to the predetermined message received from the eNB 200 (cell #1) in the random access procedure, the random access procedure, and selects, from among a plurality of cells, the selection target cell used as the serving cell. Here, the cell #2 is selected as the selection target cell.

In step S24, the UE 100 transmits, to the eNB 200 (cell #1), a message (Scheduled Transmission) including predetermined information, at a timing determined by a reception timing of the response message (Random Access Response).

In step S25, the eNB 200 (cell #1) transmits, to the eNB 200 (cell #2), a message (Connection routed) including the RACH information used in the random access procedure.

In step S26, the eNB 200 (cell #2) permits connection of the UE 100 to the cell #2.

In step S27, the eNB 200 (cell #2) transmits, to the eNB 200 (cell #1), a message (Connection routed ACK) indicating that the connection of the UE 100 to the cell #2 is permitted.

In step S28, the UE 100 receives, from the eNB 200 (cell #2), a response message (Contention Resolution) to the message (Scheduled Transmission).

As described above, by resuming the random access procedure for the eNB 200 (cell #2), the random access procedure for the eNB 200 (cell #2) succeeds.

Secondly, a case where the random access procedure for the selection target cell fails will be described with reference to FIG. 9.

As illustrated in FIG. 9, in step S30, the UE 100 is in the RRC idle state, similarly to step S10.

In step S31, similarly to step S11, the UE 100 starts the random access procedure. Specifically, the UE 100 transmits, to the eNB 200 (cell #1), a message (Random Access Preamble) including a random access preamble selected from among a plurality of random access preambles.

In step S32, similarly to step S12, the UE 100 receives, from the eNB 200 (cell #1), a response message (Random Access Response) to the message (Random Access Preamble). Here, the response message (Random Access Response) is, as described above, an example of a predetermined message for prompting to select the selection target cell used as the serving cell.

In step S33, similarly to step S13, the UE 100 interrupts, in response to the predetermined message received from the eNB 200 (cell #1) in the random access procedure, the random access procedure, and selects, from among a plurality of cells, the selection target cell used as the serving cell. Here, the cell #2 is selected as the selection target cell.

In step S34, the UE 100 transmits, to the eNB 200 (cell #1), a message (Scheduled Transmission) including predetermined information, at a timing determined by a reception timing of the response message (Random Access Response).

In step S35, the eNB 200 (cell #1) transmits, to the eNB 200 (cell #2), a message (Connection routed) including the RACH information used in the random access procedure.

In step S36, the eNB 200 (cell #2) denies connection of the UE 100 to the cell #2.

In step S37, the eNB 200 (cell #2) transmits, to the eNB 200 (cell #1), a message (Connection routed NACK) indicating that connection of the UE 100 to the cell #2 is denied.

In step S38, the UE 100 receives, from the eNB 200 (cell #1), a response message (Contention Resolution) to the message (Scheduled Transmission).

As described above, the random access procedure for the eNB 200 (cell #2) is resumed, but the random access procedure for the eNB 200 (cell #2) fails.

It is noted that, in FIG. 8 and FIG. 9, in step S24 or step S34, the UE 100 transmits, to the eNB 200 (cell #1), the message (Scheduled Transmission) including the predetermined information, however, the second modification is not limited thereto. Specifically, before step S24 and step S34, if the RACH information used in the random access procedure for the eNB 200 (cell #1) is notified to the eNB 200 (cell #2), the eNB 200 (cell #1) may notify the UE 100, by the response message (Random Access Response), that the random access procedure for the eNB 200 (cell #2) can be continued, in step S22 or step S32. The UE 100 may transmit, to the eNB 200 (cell #2), the message (Scheduled Transmission) including the predetermined message, in response to the response message (Random Access Response) received in step S22 or step S32.

Further, the RACH information used in the random access procedure with selection of the selection target cell may be exchanged between the eNB 200 (cell #1) and the eNB 200 (cell #2). Such exchange of the RACH information may be performed before the random access preamble is transmitted from the UE 100 to the eNB 200 (cell #1). In such a case, the eNB 200 (cell #1) need not notify the eNB 200 (cell #2) of the RACH information used in the random access procedure for the eNB 200 (cell #1).

[Third Modification]

A third modification of the embodiment will be described, below. Description proceeds with a focus on a difference from the embodiment, below.

Specifically, in the embodiment, the response message (Random Access Response) is used as the predetermined message for prompting to select the selection target cell used as the serving cell. On the contrary, in the third modification, a message (Contention Resolution) for avoiding contention of an uplink transmission in the random access procedure is used as the predetermined message for prompting to select the selection target cell used as the serving cell.

(Mobile Communication Method)

Hereinafter, the mobile communication method according to the third modification will be described. FIG. 10 is a sequence diagram illustrating the mobile communication method according to the third modification.

As illustrated in FIG. 10, in step S40, the UE 100 is in the RRC idle state.

In step S41, the UE 100 starts the random access procedure. Specifically, the UE 100 transmits, to the eNB 200 (connection target cell), a message (Random Access Preamble) including a random access preamble selected from among a plurality of random access preambles. The UE 100 increases transmission power of the message (Random Access Preamble) each time the message (Random Access Preamble) is transmitted.

In step S42, the UE 100 receives, from the eNB 200 (connection target cell), the response message (Random Access Response) to the message (Random Access Preamble).

In step S43, the UE 100 transmits a message (Scheduled Transmission) including predetermined information, at a timing determined by a reception timing of the response message (Random Access Response).

In step S44, the UE 100 receives, from the eNB 200 (connection target cell), a response message (Contention Resolution) to the message (Scheduled Transmission).

Here, the response message (Contention Resolution) is, as described above, an example of the predetermined message for prompting to select the selection target cell used as the serving cell. The eNB 200 (connection target cell) transmits the response message (Contention Resolution) as the predetermined message, if a load of the connection target cell is equal to or more than a constant level.

It should be noted that, the response message (Contention Resolution) used as the predetermined message for prompting to select the selection target cell used as the serving cell is distinguished from the response message (Contention Resolution) for continuing the random access procedure. For example, both are distinguished from each other by a 1-bit flag, and the like.

In step S45, the UE 100 (controller) interrupts, in response to the predetermined message received from the eNB 200 (connection target cell) in the random access procedure, the random access procedure, and selects, from among a plurality of cells, the selection target cell used as the serving cell. Information included in the predetermined message and a method of selecting the selection target cell upon reception of the predetermined message are as described above.

Other Embodiments

The present application was described in terms of the embodiment set forth above, the application should not be understood to be limited by the statements and the drawings constituting a part of this disclosure. From this disclosure, various alternative embodiments, examples, and operational technologies will be obvious to those skilled in the art.

Although not particularly mentioned in the embodiments, the connection target cell activates a timer by transmitting the predetermined message including the recommend information, and if a timer value reaches a predetermined threshold value without resuming the random access procedure, it may be determined that the serving cell of the UE 100 has switched to another cell.

In the embodiment, a case where the predetermined message is Random Access Response or Contention Resolution is described. However, the embodiment is not limited thereto. Specifically, the predetermined message may be a new message defined by extension of the random access procedure. For example, a 1-bit flag indicating whether or not it is recommended to select a cell other than the connection target cell as the selection target cell may be added to the Random Access Response or the Contention Resolution. In addition, a downlink message including the list of the candidate cell that may be selected as the selection target cell and a new message such as scheduling information of the downlink message may be introduced. The scheduling information of the downlink message may be information (for example, RAR scheduling information) included in the Random Access Response or the Contention Resolution. Here, the downlink message scheduled by the scheduling information may be transmitted in the subframe in which the scheduling information is transmitted, or may be transmitted in the subframe after a predetermined number of subframes from the subframe in which the scheduling information is transmitted. An interval between the subframe in which the scheduling information is transmitted and the subframe in which the downlink message is transmitted (that is, the above-described predetermined number) may be a predetermined value, or may be a value included in the scheduling information.

In the embodiment, the parameter used for selecting the selection target cell is included in the predetermined message. However, the embodiment is not limited thereto. The parameter used for selecting the selection target cell may be included in the broadcast information (SIB; System Information Block) broadcast from the eNB 200 (connection target cell).

In the embodiment, the recommend information is included in the predetermined message. However, the embodiment is not limited thereto. The recommend information may be included in the broadcast information (SIB; System Information Block) broadcast from the eNB 200 (connection target cell).

Although not particularly mentioned in the embodiments, as described in the second modification, in a case where the random access procedure is resumed for another cell other than the connection target cell, the other cell may notify, if the connection between the other cell and the UE 100 is completed, the connection target cell of connection completion.

In the second modification, if the connection target cell and the selection target cell are cells provided in the identical eNB 200, the procedure of resuming the interrupted random access procedure is described. However, if the connection target cell and the selection target cell are not provided in the identical eNB 200, the random access procedure for the selection target cell may be performed again from the beginning.

Although not particularly mentioned in the embodiments, a program for causing a computer to execute each process performed by the UE 100 and the eNB 200 may be provided. Further, the program may be recorded on a computer-readable medium. With the computer-readable medium, it is possible to install the program in a computer. Here, the computer-readable medium recording therein the program may be a non-transitory recording medium. The non-transitory recording medium may include, but not be limited to, a CD-ROM and a DVD-ROM.

Alternatively, a chip may be provided which is constituted of; a memory in which a program for performing each process performed by the UE 100 and the eNB 200 is stored; and a processor for executing the program stored in the memory.

In the embodiments, an LTE system is described as an example of the mobile communication system. However, the embodiment is not limited thereto. The mobile communication system may be a system other than the LTE system.

INDUSTRIAL APPLICABILITY

The present application is useful in the field of communication.

The invention claimed is:
1. A user equipment comprising
a processor and a memory coupled to the processor, the processor configured to
transmit a random access preamble to a first cell in a random access procedure,
interrupt the random access procedure, in response to receiving a message including a random access response as a response to the random access preamble from the first cell, the message indicating that a Radio Resource Control (RRC) connection to the first cell is rejected,
and after random access procedure is interrupted, transmit a first message to the first cell, the first message causing the first cell to transmit the random access preamble received from the user equipment to a second cell selected by the user equipment.
2. An apparatus for controlling a user equipment, comprising
a processor and a memory coupled to the processor, the processor configured to transmit a random access preamble to a first cell in a random access procedure, interrupt the random access procedure, in response to receiving a message including a random access response as a response to the random access preamble from the first cell, the message indicating that a Radio Resource Control (RRC) connection to the first cell is rejected, and after the random access procedure is interrupted, transmit a first message to the first cell, the first message causing the first cell to transmit the random access preamble received from the user equipment to a second cell selected by the user equipment.

3. A method performed at a user equipment, comprising transmitting a random access preamble to a first cell in a random access procedure;

interrupting the random access procedure, in response to receiving a message including a random access response as a response to the random access preamble from the first cell, the message indicating that a Radio Resource Control (RRC) connection to the first cell is rejected;

and after the random access procedure is interrupted, transmitting a first message to the first cell, the first message causing the first cell to transmit the random access preamble received from the user equipment to a second cell selected by the user equipment.

* * * * *